(12) United States Patent
Wu et al.

(10) Patent No.: US 8,970,390 B2
(45) Date of Patent: Mar. 3, 2015

(54) METHOD AND APPARATUS OF AIDING VIEWING POSITION ADJUSTMENT WITH AUTOSTEREOSCOPIC DISPLAYS

(75) Inventors: Shuguang Wu, Austin, TX (US); Jun Xiao, Austin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 287 days.

(21) Appl. No.: 13/597,580

(22) Filed: Aug. 29, 2012

(65) Prior Publication Data
US 2014/0062710 A1 Mar. 6, 2014

(51) Int. Cl.
G08B 21/00 (2006.01)
B64D 47/06 (2006.01)
H04N 9/47 (2006.01)
G06T 15/00 (2011.01)
G09G 5/00 (2006.01)
G06K 9/00 (2006.01)

(52) U.S. Cl.
USPC ............ 340/686.1; 340/982; 340/995.17; 340/995.28; 348/59; 348/49; 348/51; 348/54; 345/419; 345/634; 345/54; 382/117; 382/154; 349/15

(58) Field of Classification Search
USPC ........ 340/686.1; 348/59, 49, E13.026, 51, 54
See application file for complete search history.

(56) References Cited

U.S. PATENT DOCUMENTS

| | | | |
|---|---|---|---|
| 5,349,379 A | 9/1994 | Eichenlaub | |
| 5,712,732 A | 1/1998 | Street | |
| 5,771,121 A | 6/1998 | Hentschke | |
| 6,055,013 A * | 4/2000 | Woodgate et al. | 348/59 |
| 6,752,498 B2 | 6/2004 | Covannon | |
| 6,929,369 B2 | 8/2005 | Jones | |
| 7,787,009 B2 | 8/2010 | Alpaslan | |
| 7,800,708 B2 | 9/2010 | Brott | |
| 8,179,362 B2 | 5/2012 | Brigham | |
| 2010/0199228 A1 | 8/2010 | Latta | |
| 2011/0035666 A1 | 2/2011 | Geisner | |
| 2011/0212810 A1 | 9/2011 | Jeka | |
| 2011/0316881 A1 * | 12/2011 | Yoshifuji et al. | 345/634 |
| 2011/0316985 A1 * | 12/2011 | Ishikawa et al. | 348/51 |
| 2011/0316987 A1 * | 12/2011 | Komoriya et al. | 348/51 |
| 2012/0139908 A1 | 6/2012 | Choi | |
| 2012/0200680 A1 | 8/2012 | So | |
| 2013/0050196 A1 * | 2/2013 | Takashima et al. | 345/419 |
| 2013/0076872 A1 * | 3/2013 | Wang | 348/51 |

OTHER PUBLICATIONS

Boev, "Comparative Study of Autostereoscopic Displays for Mobile devices", SPIE, 2011, vol. 7881, pp. 78810B1-78810B12.
Casner, "Autostereoscopic Viewing Freedom", 3M Optical System Division, 2011, 12 pages.

(Continued)

Primary Examiner — Fekadeselassie Girma

(57) ABSTRACT

A method of aiding viewing position for autostereoscopic displays having a suggested viewing zone or optimal viewing position. The method detects a position of a viewer using a detection sensor associated with the display and determines if the viewer is within the suggested viewing zone. If the viewer is not within the suggested viewing zone, the method provides feedback to the viewer, such as visual cues on the display, indicating how the viewer should move in order to be within the suggested viewing zone. The method can continuously provide the feedback in order to indicate how the viewer is moving with respect to the suggested viewing zone and when the viewer has moved into the suggested viewing zone.

18 Claims, 3 Drawing Sheets

(56) References Cited

OTHER PUBLICATIONS

Woodgate,"Flat-panel autostereoscopic displays: Characterization and enhancement," Proceedings of SPIE, 2000, vol. 3957, pp. 153-164.

Wu, U.S. Appl. No. 13/628,476, Method to Store and Retrieve Crosstalk Profiles of 3D Stereoscopic Displays, filed Sep. 27, 2012.
PCT International Search Report for PCT/US2013/050971, mailed Nov. 22, 2013.

* cited by examiner

US 8,970,390 B2

METHOD AND APPARATUS OF AIDING VIEWING POSITION ADJUSTMENT WITH AUTOSTEREOSCOPIC DISPLAYS

BACKGROUND 3D stereoscopic display is a type of display that provides the user with two or more images (e.g., a left and a right eye view) in order to achieve a three-dimensional effect. Different technologies exist for 3D stereoscopic displays, such as passive glasses (anaglyph or polarizer), active shutter glasses, and autostereoscopic (spatial multiplexing or temporal multiplexing).

Autostereoscopic displays provide users 3D experience without the use of special headgear or glasses. Such 3D experience is achieved through binocular parallax, which is the apparent difference in position of an object as seen the left and right eyes while the head remains unmoved. Autostereoscopic displays include spatial multiplexing (parallax barrier and lenticular arrays) and temporal multiplexing (directional backlight).

Most autostereoscopic displays produce 3D images that can only be seen within a narrow viewing zone in front of the displays. The range of useful distances is limited by the need that both eyes appear inside the corresponding "sweet spot" to see 3D images. Furthermore, it can be difficult for a viewer to find the optimum position for the best 3D viewing experience, which usually must be found through a trial-and-error approach of the viewer moving to different viewing positions. Accordingly, a need exists for assisting viewers in positioning themselves for viewing 3D autostereoscopic displays.

SUMMARY

A method of aiding viewing position for an autostereoscopic display, consistent with the present invention, includes detecting a position of a viewer of the autostereoscopic display having a suggested viewing zone and determining if the viewer is within the suggested viewing zone. If the viewer is not within the suggested viewing zone, the method provides feedback to the viewer indicating how the viewer should move in order to be within the suggested viewing zone.

A system for aiding viewing position for an autostereoscopic display, consistent with the present invention, includes an autostereoscopic display having a suggested viewing zone, a detection sensor for providing a signal indicating a viewer's position with respect to the autostereoscopic display, and a processor electronically connected to the autostereoscopic display and the detection sensor. The processor is configured to detect the viewer's position based upon the signal from the detection sensor and determine if the viewer is within the suggested viewing zone. If the viewer is not within the suggested viewing zone, the processor is configured to provide feedback to the viewer indicating how the viewer should move in order to be within the suggested viewing zone.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Many autostereoscopic displays have an inherent limitation of relatively narrow viewing freedom. The optimal viewing range (distance and angle) is fixed by the optical design of the display and cannot be easily adjusted other than mechanical movement of the display. Embodiments of the present invention provide feedback to a viewer to assist the viewer in finding the optimal viewing position through a combination of a detection sensor to detect the viewer's position and visual indicators provided on the display or other types of feedback. Therefore, a viewer need not rely solely on a trial-and-error approach to find the optimal viewing position, although such an approach can be used in combination with the feedback. This method of providing feedback can be coupled with different types of autostereoscopic displays (e.g., parallax barrier, lenticular, directional backlight, and others) in wide range of applications.

Figure 1:
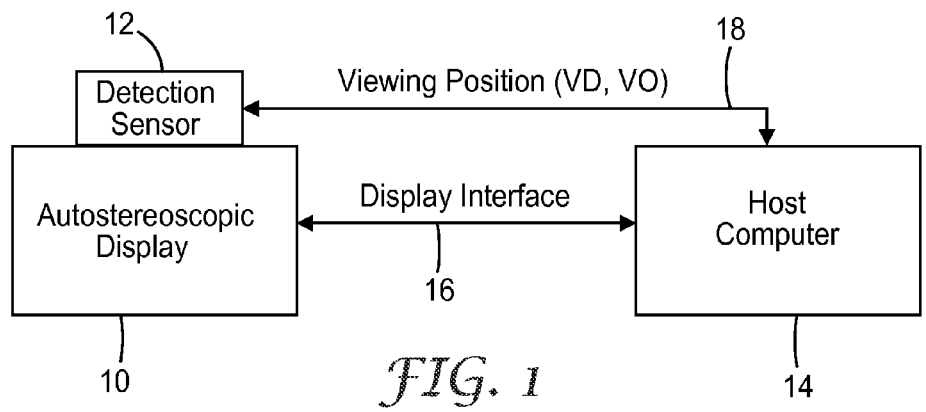
FIG. 1 is a block diagram of a system of aiding viewing position for autostereoscopic displays.

FIG. 1 is a block diagram of an exemplary system of aiding viewing position for autostereoscopic displays. The system of FIG. 1 includes an autostereoscopic display 10 with an associated detection sensor 12 and a host computer 14 for controlling autostereoscopic display 10. Detection sensor 12 provides viewing position information to host computer 14 such as via a Universal Serial Bus (USB) connection 18. Host computer 14 provides feedback information via a display interface 16 for aiding a viewer in finding a suggested or optimal viewing position. Examples of autostereoscopic displays are disclosed in U.S. Pat. Nos. 8,179,362 and 7,800,708, both of which are incorporated herein by reference as if fully set forth.

Figure 2:
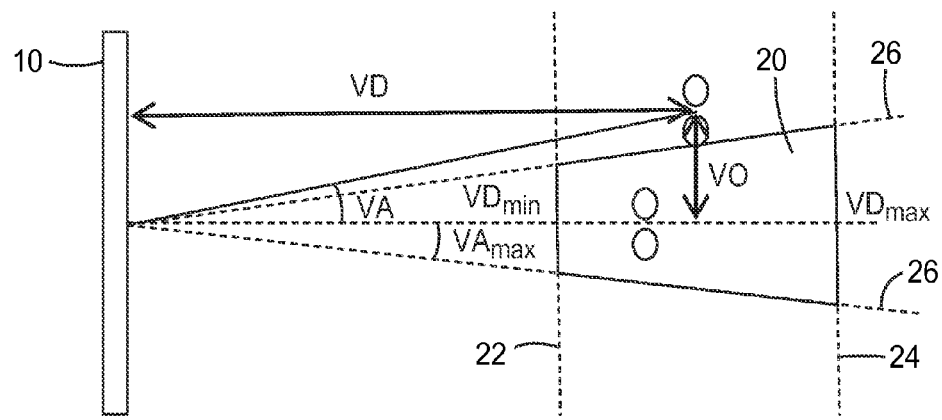
FIG. 2 is a diagram illustrating viewing positions and a suggested viewing zone for an autostereoscopic display.

FIG. 2 is a diagram illustrating viewing positions and a suggested or optimal viewing zone 20 for autostereoscopic display 10 shown as a top view. A viewer's position is represented by a viewing distance (VD) from display 10, an off-center distance (VO) relative to the center of display 10, and a viewing angle (VA). Suggested viewing zone 20 is determined by the boundaries of a minimum VD at line 22 ($VD_{min}$), a maximum VD at line 24 ($VD_{max}$), and a maximum VA along lines 26 ($VA_{max}$).

In operation, detection sensor 12 captures the real-time position of the viewer as determined by the values of VD and VO. Detection sensor 12 can be implemented with various technologies. For example, an active depth sensor can be used to obtain the face and eye position (VD, VO) of the viewer. The viewing angle (VA) can be calculated (VA=arctan(VO/VD)). Examples of an active depth sensor include the KINECT sensor from Microsoft Corporation and the sensor described in U.S. Patent Application Publication No. 2010/0199228, which is incorporated herein by reference as if fully set forth. Alternatively, two infrared (IR) transmitters and one IR receiver can be combined to provide signals for calculating VD, VA, and VO using a triangulation principle.

Detection sensor 12 includes any sensor that can provide information indicating a viewer's position in front of the display, or any combination of sensors that can collectively provide such information. Detection sensors typically provide depth information between the sensor and the viewer.

Therefore, detection sensor 12 is preferably located proximate display 10, for example on top of or underneath the display, such that the distance between the sensor and viewer is substantially equal to the distance between the display and viewer. The detection sensor can be located in other places provided the detection sensor can still provide an indication of the viewer's position. Also, the values of VD, VA, and VO can be an approximation provided the values are still sufficiently accurate to provide the feedback information to the viewer. Also, the viewer's position is determined in real-time, meaning in sufficient time to provide the feedback information useful for the viewer to change positions.

The values of the parameters for suggested viewing zone 20 can be predetermined for each particular autostereoscopic display or each display model. This determination can be made, for example, according to the operational characteristics of the autostereoscopic displays to determine the location of the optimal viewing position or boundaries for the suggested viewing zone, or both. The values of the parameters for the suggested viewing zone can be stored within the corresponding display or a memory associated with it. In particular, the optimal viewing distance (OVD) as well as the range ($VD_{min}$, $VD_{max}$) for the suggested viewing zone can be preset values suitable for an embedded system or retrieved from the autostereoscopic display through an information channel (e.g., Display Data Channel (DDC)) within the display interface (e.g., Digital Visual Interface (DVI), High-Definition Multimedia Interface (HDMI), or DisplayPort). The latter method is preferred when the host computer does not have embedded information of the optimal viewing distance for the display. Similarly, the maximal viewing angle $VA_{max}$ can be obtained from VO and VD.

Figure 3:
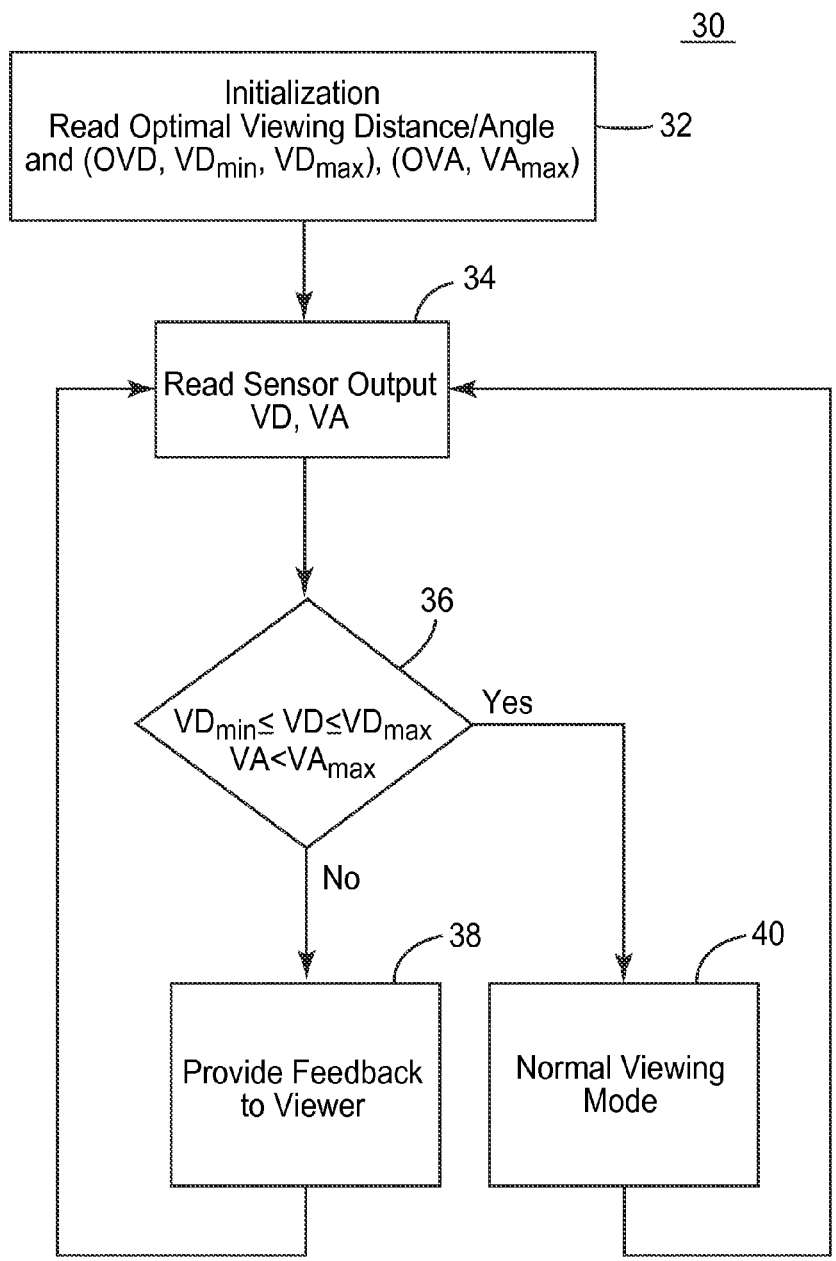
FIG. 3 is a flow chart of a method of aiding viewing position for autostereoscopic displays.

By knowing the viewer's actual position, or an approximation of it, and the suggested viewing zone, the system can provide feedback to aid the viewer in finding the suggested viewing zone. FIG. 3 is a flow chart of a method 30 of aiding viewing position for autostereoscopic displays. Method 30 can be implemented in, for example, software executed by a processor such as host computer 14. In method 30, host computer 14 initializes by reading the optimal viewing distance and angle along with the values of the associated parameters $VD_{min}$, $VD_{max}$, and $VA_{max}$ setting the boundaries for the suggested viewing zone (step 32). Host computer 14 reads the output from detection sensor 12 to determine VD and VA for the viewer's position (step 34) and determines if the viewer is within the suggested viewing zone by calculating if $VD_{min} \leq VD \leq VD_{max}$ and $VA<VA_{max}$ (step 36). If viewer is within the suggested viewing zone, host computer 14 remains in normal viewing mode without providing viewing position feedback (step 40). If the viewer is not within the suggested viewing zone, host computer 14 provides feedback to the viewer for use in moving to the suggested viewing zone (step 38). Host computer 14 can repeatedly obtain the sensor output and determine whether the viewer is within or not within the suggested viewing zone for determining whether to provide feedback and possibly change the feedback to indicate if the viewer is moving closer to or farther away from the suggested viewing zone.

Figure 4:
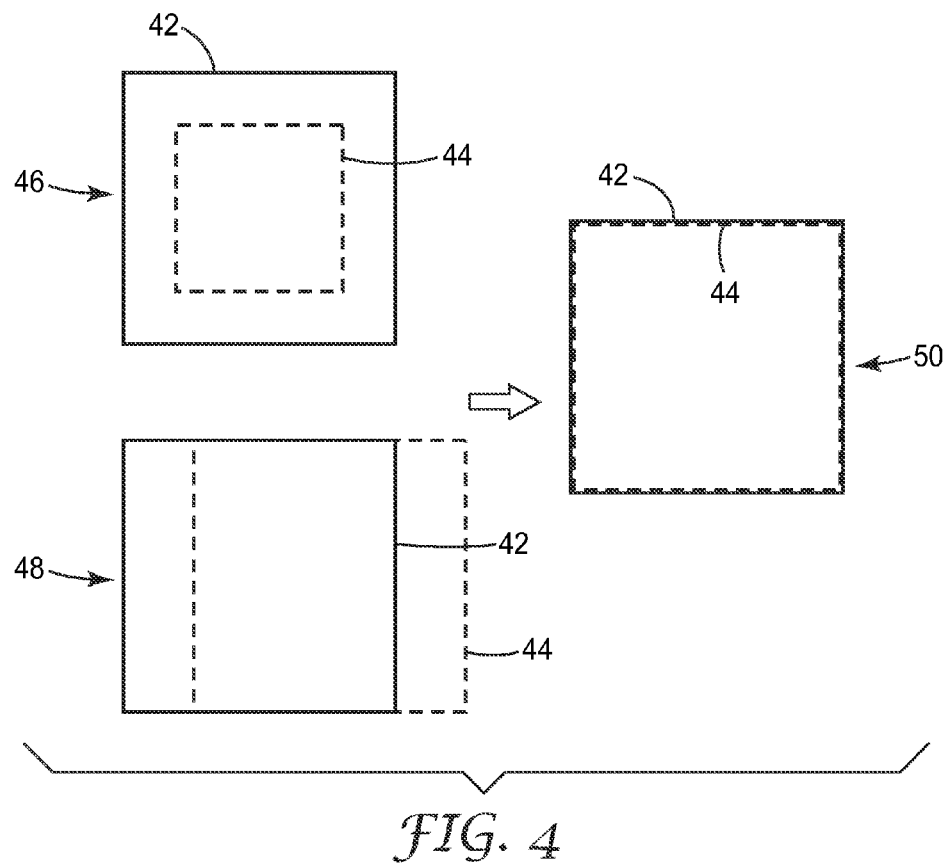
FIG. 4 is an example of feedback displayed to a viewer for use in adjusting a viewing position for autostereoscopic displays.

FIG. 4 is an example of feedback displayed to a viewer, such as via display 10, for use in adjusting a viewing position for autostereoscopic displays. In this example, a viewer is prompted to align the two rectangles by moving around in front of the display. Solid rectangle 42 represents the suggested viewing zone of the display, and dashed rectangle 44 represents the viewer's position with respect to the suggested viewing zone. When dashed rectangle 44 is of different size from solid rectangle 42, the viewer needs to adjust the distance to the display, as illustrated by feedback 46, in order to move to the suggested viewing zone. For example, if the viewer is too close to the display, dashed rectangle 44 is smaller than solid rectangle 42. If the viewer is too far away from the display, dashed rectangle 44 is larger than solid rectangle 42. When dashed rectangle 44 is offset from solid rectangle 42, the viewer needs to adjust the viewing angle, as illustrated by feedback 48, in order to move to the suggested viewing zone. For example, if dashed rectangle 44 is offset to the right of solid rectangle 42, the viewer needs to move to the left. If dashed rectangle 44 is offset to the left of solid rectangle 42, the viewer needs to move to the right. When solid rectangle 42 and dashed rectangle 44 are aligned, the "sweet spot" of the viewing distance is reached, as illustrated by feedback 50, indicating the viewer is within the suggested viewing zone or at the optimal viewing position.

Figure 5:
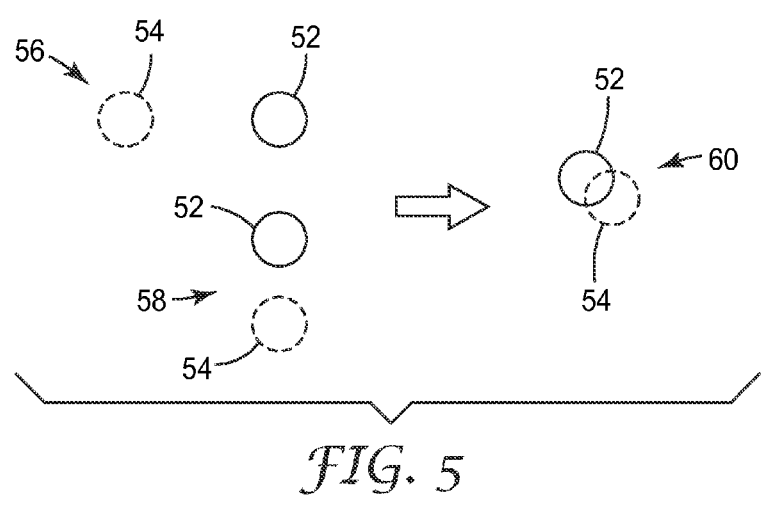
FIG. 5 is another example of feedback displayed to a viewer for use in adjusting a viewing position for autostereoscopic displays.

FIG. 5 is another example of feedback displayed to a viewer, such as via display 10, for use in adjusting a viewing position for autostereoscopic displays. In this example, a viewer is prompted to align two circles or dots by moving around in front of the display. Solid circle 52 represents the suggested viewing zone of the display, and dashed circle 54 represents the viewer's position with respect to the suggested viewing zone. When dashed circle 54 is offset to the right or left of solid circle 52, the viewer needs to adjust the viewing angle, as illustrated by feedback 56, in order to move to the suggested viewing zone. For example, if dashed circle 54 is offset to the right of solid circle 52, the viewer needs to move to the left. If dashed circle 54 is offset to the left of solid circle 52, the viewer needs to move to the right. When dashed circle 54 is offset above or below solid circle 52, the viewer needs to adjust the viewing distance, as illustrated by feedback 58, in order to move to the suggested viewing zone. For example, if dashed circle 54 is offset above solid circle 52, the viewer needs to move away from the display. If dashed circle 54 is offset below solid circle 52, the viewer needs to move closer to the display. Feedback 60 illustrates dashed circle 54 and solid circle 52 becoming aligned, meaning the viewer is very close to the suggested viewing zone. When the viewer is within the suggested viewing zone, both circles 52 and 54 disappear, indicating the viewer has reached the "sweet spot."

Other types of visual information or elements for the feedback are also possible for aiding viewing position. For example, a text dialog box can be overlaid on the display and instruct how the viewer should adjust the viewing position. Altered or manipulated images can also provide visual feedback of viewing distance through the simulation of a lens system. For example, the displayed image can be blurred when the viewer is out of the suggested viewing zone, and the degree of blurriness can correspond to how far the viewer is away from the suggested viewing zone. Similarly, brightness of the displayed image can be manipulated so that when the user is off the center plane and out of the suggested viewing zone, the image appears darker.

Animated information for the feedback can be used to animate the movement trajectory for the viewer to move to the suggested viewing zone. For example, the display can animate the zoom in and zone out sequences of the displayed image to indicate that the viewer needs to move closer to or farther away from the display. Similarly, the display can animated the rotation of the displayed image to indicate that the viewer needs to change the viewing angle.

As another example, audio information for the feedback can be used for aiding a viewing position. Audio feedback can be conveyed through adjusting left and right channel sound levels or the overall pitch level. The feedback can also be played back as recorded verbal directions or synthesized with a text-to-speech engine.

The feedback can optionally be used to move the display, which may be useful for hand held devices. Therefore, the viewer moving into the suggested viewing zone based upon the feedback can involve the viewer moving, the display moving, or both the viewer and display moving.

Table 1 provides sample code for implementing method 30 in software for execution by a processor such as host computer 14. In this sample code, two dots are displayed to a viewer for providing the feedback for the viewer to move to the suggested viewing zone for the display, as illustrated in FIG. 5 with a light gray dot used for solid circle 52 and a red dot used for dashed circle 54.

TABLE 1

Sample Code for Aiding Viewing Position

```
// get input for some parameters, e.g. how sensitive should the red dot
follow the head position
void setDefaultValues( )
{
    float deltax = getinput( );
    float deltaz = getinput( );
    int maximumY = getinput( );
    int defaultRadius = getinput( );
    int defaultXOffset = getinput( );
    int defaultYOffset = getinput( );
}
//display updates
protected override void OnPaint(PaintEventArgs e)
{
    Graphics g = e.Graphics;
    // update the red dot for the scene
    Brush red = new SolidBrush(Color.Red);
    // found head position with KINECT sensor
    if (head.TrackingState == JointTrackingState.Tracked)
    {
      // get head coordinates in space
        float headX = head.Position.X;
        float headY = head.Position.Y;
        float headZ = head.Position.Z;
        //default size of the dot
        int radius = defaultRadius;
        //convert viewer's distance to the display into y position for the
        dot
        int y = Convert.ToInt32((headz − distance) * defaultYOffset);
        //set maximum y distance
        if (y < −maximumY) y = −maximumY;
        if (y > maximumY) y = maximumY;
        // if the viewer position is outside of the good viewing area,
draw the red dot accordingly
        if (headx > deltax || headx < −deltax || headz > (distance +
deltaz) || headz < (distance − deltaz))
            {
                g.FillEllipse(red, this.Width / 2 + headx * defaultXOffset,
this.Height / 2 − y, r, r);
                this.Visible = true;
            }
        //hide the dot if the viewer is inside the good viewing area
        else
            {
                this.Visible = false;
            }
    }
    base.OnPaint(e);
}
```

The invention claimed is:

1. A method of aiding viewing position for an autostereoscopic display, comprising:
   detecting a position of a viewer of an autostereoscopic display having a suggested viewing zone;
   determining if the viewer is within the suggested viewing zone; and
   if the viewer is not within the suggested viewing zone, providing feedback, using a processor, to the viewer indicating how the viewer should move in order to be within the suggested viewing zone,
   wherein the providing step includes displaying on the autostereoscopic display a first visual element representing the suggested viewing zone and a second visual element representing the viewer's position with respect to the suggested viewing zone, and changing a displayed position of the second visual element with respect to the first visual element in real-time as the viewer's position changes in order to indicate how the viewer's change in position relates to the suggested viewing zone.

2. The method of claim 1, further comprising retrieving the suggested viewing zone from the autostereoscopic display.

3. The method of claim 1, wherein the detecting step includes using a depth sensor to determine the position of the viewer.

4. The method of claim 1, wherein the determining step includes determining if $VD_{min} \leq VD \leq VD_{max}$ and $VA < VA_{max}$, where
   VD represents a distance of the viewer from the autostereoscopic display,
   VA represents an off-center angle of the viewer from the autostereoscopic display,
   $VD_{min}$ is a minimum viewing distance for the suggested viewing zone,
   $VD_{max}$ is a maximum viewing distance for the suggested viewing zone, and
   $VA_{max}$ is a maximum off-center viewing angle for the suggested viewing zone.

5. The method of claim 1, wherein the providing step includes providing audio information as the feedback.

6. The method of claim 1, wherein the providing step includes providing animated information as the feedback.

7. The method of claim 1, wherein the providing step includes displaying a first rectangle as the first visual element and a second rectangle as the second visual element, and changing a size or a position of the second rectangle on the autostereoscopic display based upon the viewer's position.

8. The method of claim 1, wherein the providing step includes displaying a first circle as the first visual element and a second circle as the second visual element, and changing a position of the second circle on the autostereoscopic display based upon the viewer's position.

9. A system for aiding viewing position for an autostereoscopic display, comprising:
   an autostereoscopic display having a suggested viewing zone;
   a detection sensor; and
   a processor electronically connected to the autostereoscopic display and the detection sensor, wherein the processor is configured to:
      detect a position of a viewer of the autostereoscopic display based upon a signal received from the detection sensor;
      determine if the viewer is within the suggested viewing zone; and
      if the viewer is not within the suggested viewing zone, provide feedback to the viewer indicating how the viewer should move in order to be within the suggested viewing zone,
      wherein the processor is configured to display on the autostereoscopic display a first visual element representing the suggested viewing zone and a second visual element representing the viewer's position with respect to the suggested viewing zone, and change a displayed position of the second visual element with respect to the first visual element in real-time as the viewer's position changes in order to indicate how the viewer's change in position relates to the suggested viewing zone.

10. The system of claim 9, wherein the processor is configured to retrieve the suggested viewing zone from the autostereoscopic display.

11. The system of claim 9, wherein the detection sensor comprises a depth sensor.

12. The system of claim 9, wherein the processor is configured to determine if $VD_{min} \leq VD \leq VD_{max}$ and $VA < VA_{max}$, where VD represents a distance of the viewer from the autostereoscopic display, VA represents an off-center angle of the viewer from the autostereoscopic display, $VD_{min}$ is a minimum viewing distance for the suggested viewing zone, $VD_{max}$ is a maximum viewing distance for the suggested viewing zone, and $VA_{max}$ is a maximum off-center viewing angle for the suggested viewing zone.

13. The system of claim 9, wherein the processor is configured to provide audio information as the feedback.

14. The system of claim 9, wherein the processor is configured to provide animated information as the feedback.

15. The system of claim 9, wherein the processor is configured to display a first rectangle as the first visual element and a second rectangle as the second visual element, and change a size or a position of the second rectangle on the autostereoscopic display based upon the viewer's position.

16. The system of claim 9, wherein the processor is configured to display a first circle as the first visual element and a second circle as the second visual element, and change a position of the second circle on the autostereoscopic display based upon the viewer's position.

17. A method of aiding viewing position for an autostereoscopic display, comprising:

detecting a position of a viewer of an autostereoscopic display having a suggested viewing zone;

determining if the viewer is within the suggested viewing zone; and if the viewer is not within the suggested viewing zone, providing feedback, using a processor, to the viewer indicating how the viewer should move in order to be within the suggested viewing zone, wherein the providing step includes altering an appearance of an image displayed on the autostereoscopic display based upon the viewer's position, and changing the appearance of the image in real-time based upon the viewer's position with respect to the suggested viewing zone;

wherein the providing step further includes blurring the image displayed on the autostereoscopic display and changing a degree of the blurriness based upon the viewer's position.

18. A system for aiding viewing position for an autostereoscopic display, comprising:

an autostereoscopic display having a suggested viewing zone;

a detection sensor; and a processor electronically connected to the autostereoscopic display and the detection sensor, wherein the processor is configured to:

detect a position of a viewer of the autostereoscopic display based upon a signal received from the detection sensor;

determine if the viewer is within the suggested viewing zone; and if the viewer is not within the suggested viewing zone, provide feedback to the viewer indicating how the viewer should move in order to be within the suggested viewing zone, wherein the processor is configured to alter an appearance of an image displayed on the autostereoscopic display based upon the viewer's position, and change the appearance of the image in real-time based upon the viewer's position with respect to the suggested viewing zone;

wherein the processor is further configured to blur the image displayed on the autostereoscopic display and change a degree of the blurriness based upon the viewer's position.

* * * * *